UNITED STATES PATENT OFFICE.

ADOLF LIEBMANN, OF BONN, PRUSSIA, GERMANY.

MANUFACTURE OF THE HIGHER HOMOLOGUES OF PHENOL, NAPHTHOL, AND RESORCIN.

SPECIFICATION forming part of Letters Patent No. 252,782, dated January 24, 1882.

Application filed August 16, 1881. (Specimens.)

*To all whom it may concern:*

Be it known that I, Dr. ADOLF LIEBMANN, a resident of the city of Bonn, in the Kingdom of Prussia, German Empire, have invented a new and useful Improvement in the Manufacture of Coloring-Matters, of which the following is a specification.

Prior to my invention or discovery it was not known that the so-called "phenols" could be converted into the higher homologues by heating them with chloride of zinc and methylic or benzylic alcohol or their homologues.

I confine myself in this patent to phenol, ($C_6H_6O$,) resorcin, ($C_6H_6O_2$,) alpha and beta naphthol, ($C_{10}H_8O$,) and their homologues.

My process is as follows: I take one part, by weight, of phenol, one part of the corresponding fatty alcohol, and one and a half its quantity of chloride of zinc. These substances I place in a suitable vessel or still provided with an ascending condenser and heat them until two layers are formed. The oil which separates on the addition of water I wash several times with water and a little acid, and then purify it by fractional distillation.

In carrying out my invention, in practice, in the manufacture, for example, of amyl-phenol, I act as follows: I take ninety-four kilograms phenol; ninety-four kilograms amyl-alcohol; three hundred kilograms chloride of zinc. These are heated by an ascending condenser till two layers are formed. After the addition of water the amyl-phenol formed is rectified. The product, boiling between 245° and 248° centigrade, solidifies.

By a corresponding process I produce butyl-phenol, benzyl-phenol, and other higher homologues of phenol, naphthol, and resorcin. Of those substances, the following are of especial interest: isobutyl-phenol solid, melting-point 92° to 93°, boiling-point 236° to 238°; isoamyl-phenol solid, melting-point 87°, boiling-point 248° to 250°; benzyl-phenol liquid, melting point 87°, boiling-point 314° to 316°; benzyl-resorcin solid; ethyl-naphthol solid.

The new phenols obtained by my process are very similar in their chemical appearance and properties to the corresponding phenol, naphthol, or resorcin, and in general differ only in boiling-point and specific gravity. Thus, for example, amyl-phenol, butyl-phenol, or benzyl-phenol will be found to have very similar properties to the original carbolic acid from which they are produced. These new products have great commercial value, as they can be substituted for phenol, naphthol, or resorcin in nearly all cases in which those substances are now solely applied—as, for instance, for disinfectants, and in the manufacture of coloring-matters and salicylic acid.

I do not claim a class of organic bodies, but a new technical process, the same in all the cases of producing from substances well-known in commerce and the arts the new series of homologous substances hereinbefore enumerated.

What I claim as my invention and desire to secure by Letters Patent, is—

The process above described for the transformation of phenol, naphthol, and resorcin into their higher homologues, the same consisting in subjecting them while in a suitable still to the action of the corresponding fatty alcohols in the presence of chloride of zinc or similar metallic salts producing condensation, all substantially as specified.

In testimony whereof I have signed this specification in the presence of two subscribing witnesses.

DR. ADOLF LIEBMANN.

Witnesses:
RUDOLPH MADES,
JAKOB SEIKLER.